United States Patent
Lee et al.

(10) Patent No.: US 11,182,625 B2
(45) Date of Patent: Nov. 23, 2021

(54) METHOD FOR IDENTIFYING OBSTACLE ON DRIVING GROUND AND ROBOT FOR IMPLEMENTING SAME

(71) Applicant: LG ELECTRONICS INC., Seoul (KR)

(72) Inventors: Changhyeon Lee, Seoul (KR); Byungkon Sohn, Seoul (KR)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 16/500,672

(22) PCT Filed: Feb. 19, 2018

(86) PCT No.: PCT/KR2018/002029
§ 371 (c)(1),
(2) Date: Oct. 3, 2019

(87) PCT Pub. No.: WO2018/186583
PCT Pub. Date: Oct. 11, 2018

(65) Prior Publication Data
US 2020/0089970 A1   Mar. 19, 2020

(30) Foreign Application Priority Data
Apr. 4, 2017 (KR) .................. 10-2017-0043924

(51) Int. Cl.
*G06K 9/00* (2006.01)
*G06T 7/50* (2017.01)
*G05D 1/02* (2020.01)

(52) U.S. Cl.
CPC ....... *G06K 9/00805* (2013.01); *G05D 1/0214* (2013.01); *G05D 1/0238* (2013.01);
(Continued)

(58) Field of Classification Search
None
See application file for complete search history.

(56) References Cited

U.S. PATENT DOCUMENTS

| 8,649,557 | B2 | 2/2014 | Hyung et al. |
| 2007/0282484 | A1 | 12/2007 | Chung et al. |

(Continued)

FOREIGN PATENT DOCUMENTS

| JP | H1083446 | 3/1998 |
| JP | 2014085940 | 5/2014 |

(Continued)

OTHER PUBLICATIONS

PCT International Application No. PCT/KR2018/002029, International Search Report dated Jun. 5, 2018, 4 pages.

(Continued)

*Primary Examiner* — Wei Wen Yang
(74) *Attorney, Agent, or Firm* — Lee, Hong, Degerman, Kang & Waimey

(57) ABSTRACT

The present disclosure relates to a method for identifying an obstacle on a driving ground and a robot for implementing the same, and according to one embodiment of the present disclosure, the method for identifying an obstacle on a driving ground comprises the steps of allowing: a sensing module of the robot to sense the depths of objects in a driving direction so as to generate first depth information; a plane analysis unit of the sensing module to calibrate second depth information by using ground information stored by a map storage of the robot so as to generate the first depth information; a control unit to identify an obstacle from the second depth information; and the control unit to store position information of the identified obstacle in a temporary map of the map storage.

15 Claims, 15 Drawing Sheets

(52) U.S. Cl.
CPC ............ *G06K 9/00664* (2013.01); *G06T 7/50* (2017.01); *G05D 2201/0203* (2013.01); *G06T 2207/10024* (2013.01); *G06T 2207/10028* (2013.01); *G06T 2207/30261* (2013.01)

(56) References Cited

U.S. PATENT DOCUMENTS

| | | | |
|---|---|---|---|
| 2013/0274924 A1 | 10/2013 | Chung et al. | |
| 2018/0157328 A1* | 6/2018 | Brunner | G06F 3/0304 |
| 2018/0189565 A1* | 7/2018 | Lukierski | A47L 9/009 |
| 2018/0246518 A1* | 8/2018 | Vogel | G05D 1/0274 |

FOREIGN PATENT DOCUMENTS

| | | |
|---|---|---|
| KR | 20070115245 | 12/2007 |
| KR | 1020090067484 | 6/2009 |
| KR | 1020110020961 | 3/2011 |
| KR | 101041930 | 6/2011 |
| KR | 1020130045743 | 5/2013 |
| KR | 101598385 | 3/2016 |
| KR | 1020160119574 | 10/2016 |

OTHER PUBLICATIONS

Korean Intellectual Property Office Application Serial No. 10-2017-0043924, Office Action dated Aug. 23, 2021, 6 pages.

* cited by examiner

FIG. 3
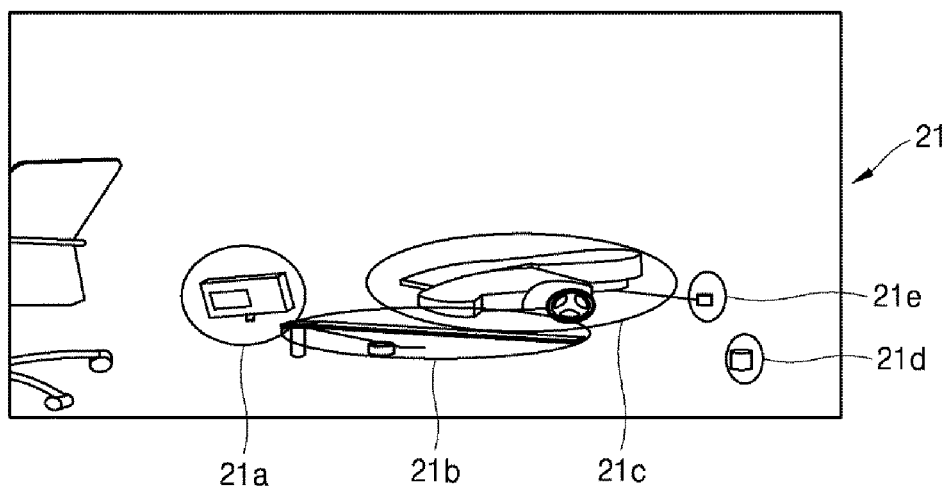
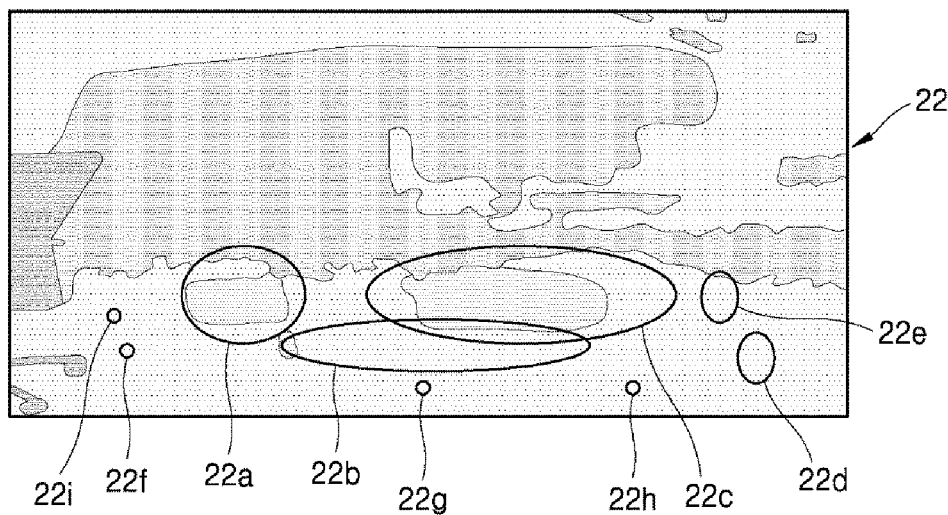

FIG. 4
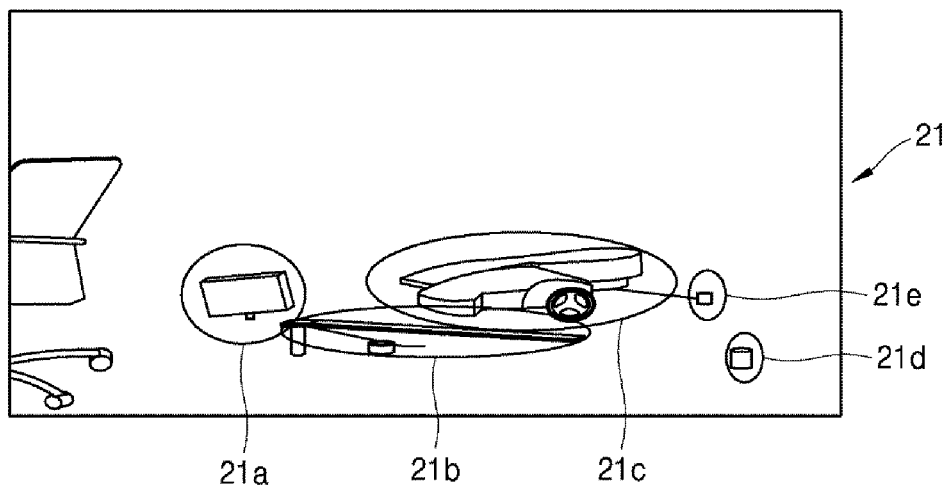
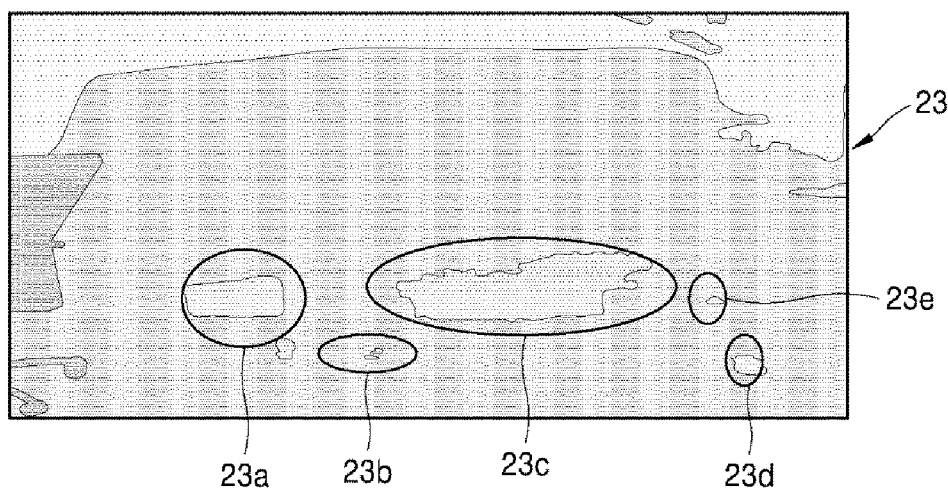

FIG. 5
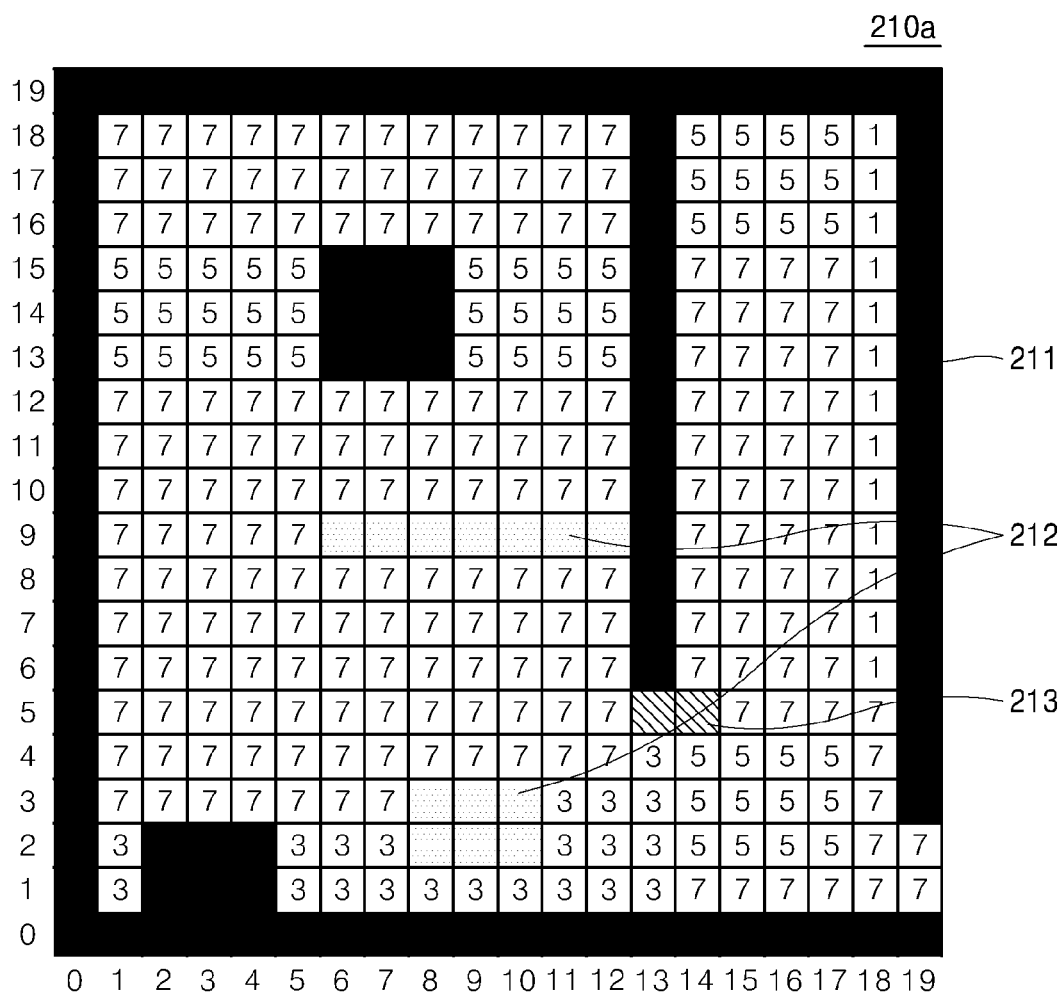
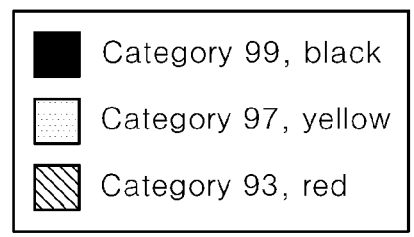

FIG. 6

| | Ccategory of feature information |
|---|---|
| Stationary object | 91~99 |
| Floor surface | 1~20 |

201a

| | Category of feature information |
|---|---|
| Concrete stationary object | 99 |
| Glass stationary object | 97 |
| Metal stationary object | 95 |
| Plastic stationary object | 93 |
| Non-categorized stationary object | 91 |
| Reserved | 8~90 |
| Marble flooring | 7 |
| Glass flooring | 5 |
| Carpet flooring-Gray | 3 |
| Carpet flooring-RED | 1 |

201b

| Category of feature information | |
|---|---|
| 7 | First plane equation (vX1, vY1, vZ1, vD1) |
| 5 | Second plane equation (vX2, vY2, vZ2, vD2) |
| 3 | Third plane equation (vX3, vY3, vZ3, vD3) |
| 1 | Fourth plane equation (vX4, vY4, vZ4, vD4) |

|  |  | 21x_line1 | | 21x_line2 |
|---|---|---|---|---|
| −2 | −1 | +25 | +2 | −35 |
| −1 | +3 | +30 | −7 | −40 |
| +3 | +2 | +2 | −10 | −22 |
| +2 | −2 | +1 | +4 | +9 |
| +4 | −3 | −5 | −13 | +10 |

| 150 |  | 2 | 5 | 5 |
|-----|-----|-----|-----|-----|
| 210 | 10 | 15 |  |  |
| 28 |  | 5 |  |  |
| 100 |  | 23 | 34 | 23 |
|  |  | 35 | 21 | 22 |

1202

| 150 |  |  |  |  |
|-----|-----|-----|-----|-----|
| 210 |  |  |  |  |
|  |  |  |  |  |
| 100 |  |  | 34 |  |
|  |  | 35 |  |  |

FIG. 15

| Z value depending on floor material(mm) | X:80 , Y:460 | X:560, Y:460 | X:320, Y:400 |
|---|---|---|---|
| Area A grey carpet on third floor | 2016~2040 | 1970~1993 | 2859~2883 |
| Area A pink carpet on third floor | 1993~2005 | 1993~2016 | 2812 |
| Area A in hall on third floor-dark | 2005~2016 | 1993~2016 | 2835~2859 |
| Area B marble flooring on first floor-dark | 2016~2040 | 2040~2065 | 2859~2908 |
| Area B marble flooring on first floor-light | 2016~2040 | 2028~2040 | 2859~2908 |
| Area B carpet on first floor | 2028~2040 | 2040~2053 | 2908~2933 |
| Area C marble flooring | 2016~2065 | 2016~2040 | 2835~2908 |

METHOD FOR IDENTIFYING OBSTACLE ON DRIVING GROUND AND ROBOT FOR IMPLEMENTING SAME

CROSS-REFERENCE TO RELATED APPLICATIONS

This application is the National Stage filing under 35 U.S.C. 371 of International Application No. PCT/KR2018/002029, filed on Feb. 19, 2018, which claims the benefit of earlier filing date and right of priority to Korean Application No. 10-2017-0043924, filed on Apr. 4, 2017, the contents of which are hereby incorporated by reference herein in its entirety.

TECHNICAL FIELD

The present invention relates to a method of identifying obstacles on the driving surface and a robot for implementing the same.

BACKGROUND ART

To operate in spaces where lots of people or commodities come in and out, such as airports, schools, government buildings, hotels, offices, factories, gyms, auditoriums, or other cultural facilities, robots require continuous space sensing while driving. During the course, robots may store information about things placed in the space or the structure of the space on a map.

Meanwhile, robots may set a driving route based on various pieces of information sensed while driving and, to that end, it is required to determine whether the flooring surface, i.e., driving surface, in the space where the robot drives, is a plane on which it may advance. This requires a process for identifying the height or material of the driving surface or things which are not easily noticeable on the driving surface.

In particular, a busy space may come with various kinds of flooring and have carpeting or a diversity of things placed on. Thus, if the moving means of the robot fails to sense varying factors on the driving surface, the robot may stop or fall down on the driving surface. To address these issues, the disclosure proposes a way to allow the robot to identify the driving surface and drive based on the identified results.

DISCLOSURE

Technical Problem

The disclosure addresses the foregoing issues and provides a method of identifying obstacles placed in the driving direction to change the route or avoid the obstacles and an apparatus for implementing the same.

According to the disclosure, there are also provided a method of depth-sensing obstacles placed close the floor surface, with floor surface information removed to thereby identify low-profile obstacles and an apparatus for implementing the same.

Also provided are a method of lessening the risk of collision with an obstacle while the robot moves using depth information updated in real-time and an apparatus for implementing the same, according to the disclosure.

The present disclosure is not limited to the foregoing objectives, but other objects and advantages will be readily appreciated and apparent from the following detailed description of embodiments of the present disclosure. It will also be appreciated that the objects and advantages of the present disclosure may be achieved by the means shown in the claims and combinations thereof.

Technical Solution

According to an embodiment of the present disclosure, a method of identifying an obstacle on a driving floor surface comprises depth-sensing objects in an advancing direction to thereby generate first depth information, by a sensing module of a robot, calibrating the first depth information using floor surface information stored by a map storage of the robot to thereby generate second depth information, by a plane analyzer of the sensing module, identifying an obstacle from the second depth information, by a controller, and storing position information for the identified obstacle in a temporary map of the map storage, by the controller.

According to another embodiment of the present disclosure, a robot identifying an obstacle on a driving surface comprises a sensing module depth-sensing objects in an advancing direction of the robot to thereby generate first depth information and calibrating the first depth information to thereby generate second depth information, a controller identifying an obstacle in the second depth information, a map storage including a temporary map storing position information about the identified obstacle under control of the controller, and a moving unit moving the robot under control of the controller.

Advantageous Effects

Application of embodiments of the present disclosure allows a high-profile robot, moving in a wide space, to precisely detect information for obstacles within several meters of the robot in real-time.

Further, application of embodiments of the present disclosure enables a sensing of obstacles placed close to the floor surface in the direction along which the robot moves and, particularly, processing of 3D data (depth information) generated in real-time by the depth sensor, thereby effectively detecting information for obstacles within a predetermined range from the robot.

Also, application of embodiments of the present disclosure allows the robot to move in a broad area while effectively avoiding obstacles by storing obstacles in the area which the depth sensor cannot sense in a temporary map until the robot escapes off the area of danger.

The effects of the present disclosure are not limited to thereto, and one of ordinary skill in the art may readily elicit various effects of the present disclosure from the configuration of the present disclosure.

BRIEF DESCRIPTION OF DRAWINGS

FIGS. 3 and 4 are views illustrating results of removal of information corresponding to the floor surface from information sensed by the depth sensor according to an embodiment of the present disclosure.

FIG. 5 is a view illustrating a configuration of a fixture map according to an embodiment of the present disclosure.

FIG. 6 is a view illustrating feature information for information stored in a fixture map and categories therefor, according to an embodiment of the present disclosure.

FIG. 8 is a view illustrating a result of obtaining a difference from a neighboring pixel in an image sensed by the vision sensor, by the controller, according to an embodiment of the present disclosure.

FIG. 12 is a view illustrating an example of storing the height of an obstacle in a temporary map according to an embodiment of the present disclosure.

FIG. 15 is a view illustrating a variation in the Z value depending on the material of the floor.

DETAILED DESCRIPTION

Figure 1:
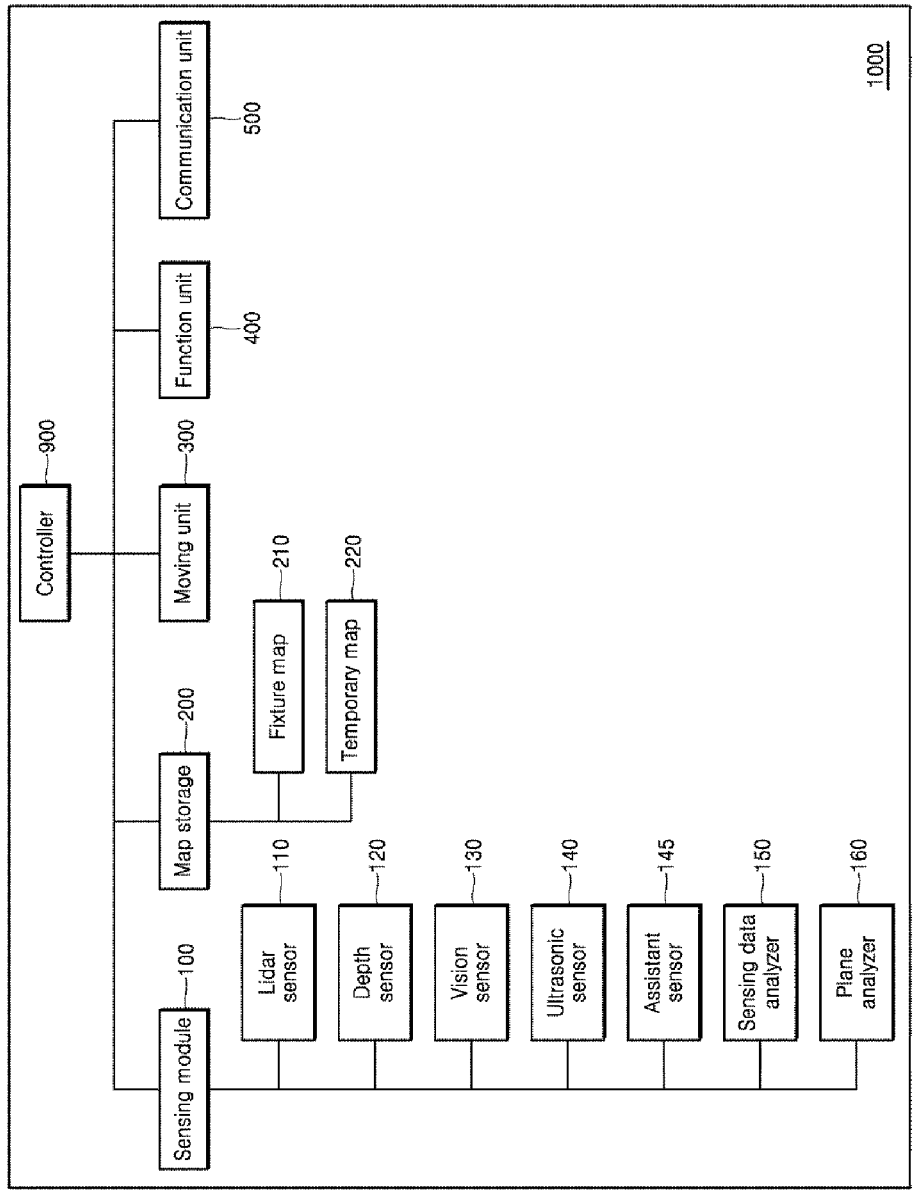
FIG. 1 is a view illustrating a configuration of a robot according to an embodiment of the present disclosure.

Hereinafter, embodiments of the disclosure will be described in detail with reference to the accompanying drawings such that the disclosure can be easily implemented by those skilled in the art. The disclosure can be embodied in various forms and is not limited to the embodiments.

Parts which are not associated with description will be omitted in order to clearly describe the disclosure, and the same or similar elements over the entire specification will be referred to by the same reference signs. Some embodiments of the disclosure will be described in detail with reference to the accompanying drawings. In the drawings, the same elements will be referred to by as the same reference signs as possible. In the following description, when detailed description of the relevant known configurations or functions is determined to obscure the important point of the present disclosure, the detailed description will be omitted.

Terms such as first, second, A, B, (a), and (b) can be used to describe elements of the disclosure. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element may "interposed" therebetween or the elements may be "coupled" or "connected" to each other with still another element interposed therebetween.

In embodying the disclosure, elements can be segmented and described for the purpose of convenience of explanation, these elements may be embodied in one device or module, or one element or may be divided and embodied into two or more devices or modules.

Hereinafter, in the disclosure, the robot includes a device which has a specific purpose (e.g., clean-up, security, monitoring, or guide) or moves while providing a function according the feature of a space where the robot moves. Thus, in the disclosure, robot collectively refers to devices with a means for moving using predetermined information and a sensor and providing a predetermined function.

In the disclosure, the robot has a map and is movable. Map means information about stationary objects, such as fixed walls or stairs identified as immobile. Information about dynamic objects positioned periodically may also be stored on the map. According to an embodiment, information about obstacles placed within a predetermined range from the advancing direction of the robot may be stored on the map. In this case, whereas the stationary objects are stored in the map, information about the obstacles may be temporarily stored in the map and be removed after the robot moves.

The robot may store state information about the floor, i.e., floor surface information, for areas where no stationary object is placed on the map, i.e., space where no separate obstacle is installed to allow the robot to enter. For example, an exemplary embodiment of the floor surface information includes information about the material of the floor. Exemplary embodiments of the floor material information may include the carpet or marble of the floor detected in real-time by the depth sensor or vision sensor. It may be figured out whether the robot may enter by grasping obstacles on the floor surface.

The floor surface information which may be stored on the map of the robot may include information about the material, color, or kind of the floor.

FIG. 1 is a view illustrating a configuration of a robot according to an embodiment of the present disclosure. Although FIG. 1 shows a hierarchical configuration of the robot, this is simply for representing the components of the robot in a logical manner, and the physical configuration of the robot may differ. Multiple logical components may be included in a single physical component, or multiple physical components may constitute a single logical component. The hierarchy of FIG. 1 is not necessarily maintained.

The sensing module 100 senses external objects and provides the sensed information to the controller 900. According to an embodiment, the sensing module 100 may include a lidar sensor 110 that obtains the material and distance of the external objects, e.g., walls, glasses, or metal doors, in the current position of the robot based on the intensity and time (speed) of reflection of signals. The sensing module 100 may further include a depth sensor 120 and a views illustrating 130 that obtain depth information for the robot and external objects.

The depth sensor 120 may include a depth camera. The depth sensor may determine the distance between the robot and the external object and be combined with the lidar sensor 110 to raise the sensing accuracy of the distance between the external object and the robot. The depth sensor 120 may obtain depth information about the floor surface in the driving direction of the robot.

The vision sensor 130 may include a camera. The vision sensor 130 may capture an image of objects around the robot. In particular, the robot may identify whether the external object is a moving object by differentiating between an image of, e.g., a stationary object, which does not frequently change, and an image where the moving object is placed. The vision sensor 130 may sense the material of the floor, allowing the controller 900 to compare the same with floor surface information stored in the map.

The sensing module 100 may further include an ultrasonic sensor 140 that senses whether there are objects within a predetermined distance from the robot 1000. The ultrasonic sensor 140 provides information resultant from determination of whether there are objects within the predetermined distance from the robot 1000.

A plurality of assistant sensors 145 may also be arranged, such as thermal sensors or ultrasonic sensors. The assistant sensors provide assistant sensing information necessary for generating the map or sensing the external objects. The assistant sensors also sense the objects placed on the floor surface while the robot drives and provide information.

The sensing data analyzer 150 analyzes the pieces of information sensed by the multiple sensors and transfer the result of analysis to the controller 900. For example, if an object on the floor surface is sensed by the multiple sensors, each sensor may provide feature and distance information about the object. The sensing data analyzer 150 combines the values and transfer the combination to the controller 900.

The plane analyzer 160 may be included in the sensing module 100 or, alternatively, be included in the controller 900. The plane analyzer 160 analyzes the floor surface placed in the driving direction of the robot based on the information that the depth sensor 120 and the vision sensor 130 provide, thereby analyzing whether the floor surface is flat or where the floor surface has an obstacle.

The map storage 200 stores information about objects placed in the space where the robot moves. The map storage 200 includes a fixture map 210 that stores information for stationary objects, which are immobile or fixed in place, among the objects placed in the overall space where the robot moves. One fixture map 210 may be essentially included depending on the space. The fixture map 210 has only objects, which are least mobile in the space and, thus, while moving in the space, the robot may sense more objects than those indicated in the fixture map 210.

The fixture map 210 may essentially store position information about the stationary objects and may additionally store feature information about the stationary objects, such as, e.g., material, color, or height information. The fixture map 210 may also include floor surface information about the space where no object is placed. Such additional information, e.g., material, color, height, or floor surface information, allows the robot to easily identify any variation in the stationary objects.

Further, the robot may generate a temporary map 220 which indicates whether there is an obstacle within a predetermined range by sensing the surroundings while on the move and may move based on the temporary map 220. After the robot passes the space, the temporary map 220 may be deleted, and a new temporary map 220 may be generated.

The moving unit 300 is means to move the robot 1000, e.g., as does wheels, and moves the robot 1000 under the control of the controller 900. At this time, the controller 900 may identify the current position of the robot 1000 in an area stored in the map storage 200 and provide a moving signal to the moving unit 300. The controller 900 may generate a path in real-time or a path while moving using various pieces of information stored in the map storage 200.

The function unit 400 means providing the robot's specified function. For example, if the robot is a robot vacuum, the function unit 400 includes components necessary for clean-up. If the robot is a guide robot, the function unit 400 includes components necessary for a guide. If the robot is a security robot, the function unit 400 includes components necessary for security.

The function unit 400 may include various components depending on the robot's function and the present disclosure is not limited thereto. The communication unit 500 provides the function of transmitting information the robot obtains to an external server or other robots or the function of receiving information from the server or the other robots.

The controller 900 of the robot 1000 may generate or update the map in the map storage 200. The controller 900 may identify object information, which the sensing module 100 provides while driving, particularly obstacles placed low on the floor surface, thereby controlling the driving of the robot 1000.

Where the present disclosure is applied according to the configuration of FIG. 1, the sensing module 100 depth-senses the objects in the advancing direction of the robot to thereby generate first depth information and calibrates the first depth information to thereby generate second depth information. Specifically, the depth sensor 120 may depth-sense the objects in the advancing direction to thereby generate the first depth information. The plane analyzer 160 may generate the second depth information by calibrating the first depth information using the floor surface information stored in the map storage 200. The controller 900 may identify an obstacle from the second depth information.

The position information about the identified obstacle may be stored in the map storage 200 under the control of the controller. In particular, the controller 900 may generate a separate temporary map 220 and store position information about obstacles around the robot in the temporary map 220. The controller 900 moves the robot 1000 by controlling the moving unit 300 of the robot while maintaining the stored position of the obstacles. After the robot 1000 moves, the controller 900 may identify whether the obstacle is positioned within the operation range of the robot 1000 and, if the obstacle is positioned out of the operation range of the robot 1000, delete the obstacle from the temporary map 220 in the map storage 200.

The space to which embodiments of the present disclosure are applicable includes airports, hospitals, terminals, schools, hotels, or other large spaces where many people come in and out. In the above-described space, the robot to which the present disclosure applies may detect the position of the obstacle three-dimension (3D)-wise, store the same in a 3D map, and while driving, provide an efficient function (e.g., security, clean-up, or guide) while avoiding the obstacle.

According to an embodiment, the depth sensor 120 may sense the depth of the floor surface and the obstacle placed on the floor surface. The depth information the depth sensor 120 obtains may have an error depending on the material of the floor or light reflections. Thus, where an embodiment of the present disclosure applies, the robot 1000 may correct the feature of the floor material of the depth information sensed by the depth sensor 120 and remove the depth information obtained on the floor, thereby actually detecting only the obstacle in a precise manner.

Thus, where the present disclosure applies, the robot 1000 may perform depth data calibration depending on the floor material, thereby preventing such an occasion that the floor is erroneously detected as the obstacle or the obstacle is wrong recognized as the floor so that the obstacle is not detected. Particularly in such an environment, e.g., an airport, where many people come in and out, there are various floor materials, e.g., carpet or marble, and thus, there would be a high chance of confusion between the information about the obstacle near the floor sensed by the robot 1000 and the floor surface. If the present disclosure applies, the robot may identify the floor surface and obstacles more separately and precisely.

Figure 2:
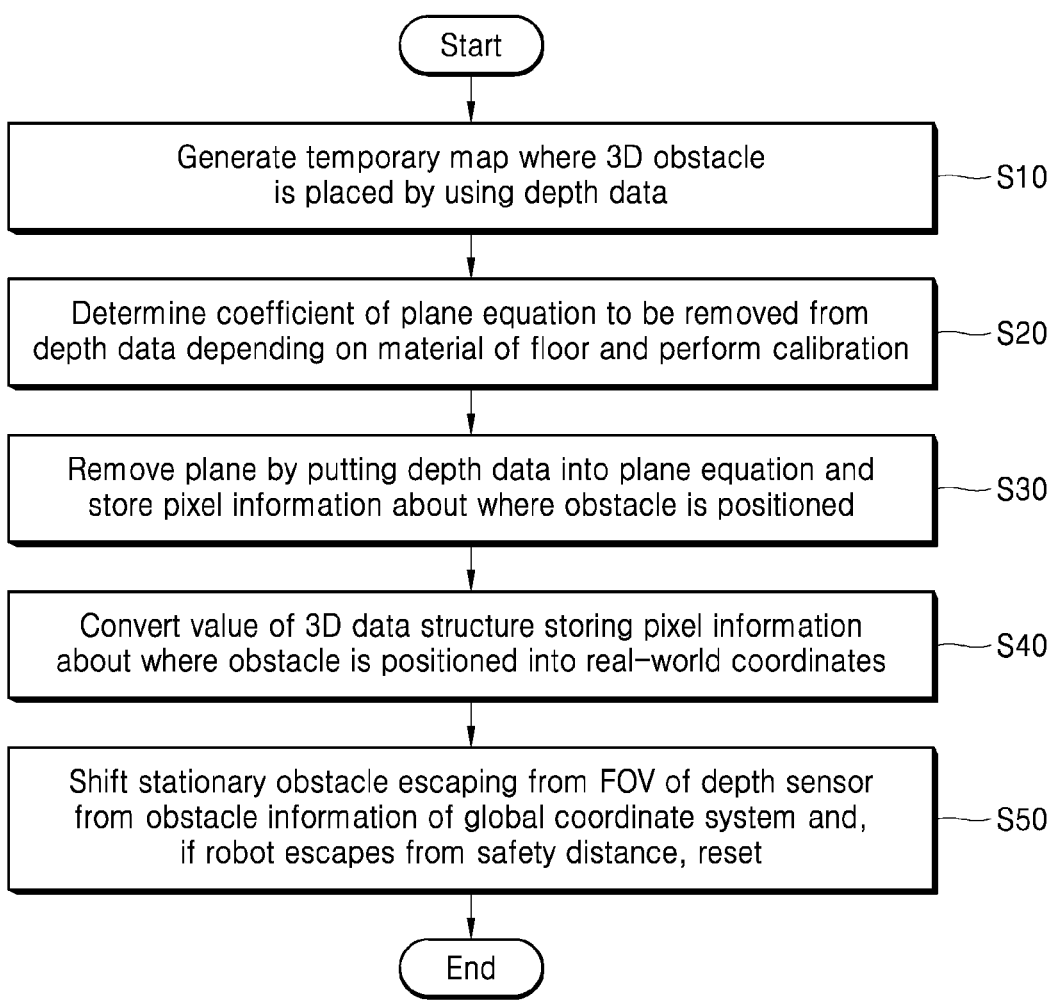
FIG. 2 is a view illustrating a process in which a robot identifies an obstacle placed on the driving surface according to an embodiment of the present disclosure.

FIG. 2 is a view illustrating a process in which a robot identifies an obstacle placed on the driving surface according to an embodiment of the present disclosure.

The controller 900 generates a temporary map where a 3D obstacle is placed by using depth data sensed by the depth sensor 120 of the sensing module 100. The temporary map 220 where the 3D obstacle is placed may include an actual obstacle or the floor mis-detected as an obstacle. An obstacle may be missing from the temporary map 220. The controller 900 performs a correction step to reflect the mis-detected or missing obstacle to the temporary map.

First, the plane analyzer 160 determines the coefficient of the plane equation to be removed from the depth data depending on the floor material and performs calibration (S20). During this course, the floor material may reflect the information on the fixture map 210, which the robot has, and the value of the floor material, which has been sensed by the vision sensor 130 and then analyzed and determined.

Next, the plane analyzer 160 puts the depth data into the plane equation to thereby remove the plane and stores the pixel information for the position of the obstacle (S30). In other words, the depth data has depth information per pixel in the image captured for a predetermined space. This means storing pixel information to allow the pixels, which have depth information determined as an obstacle, to be identified as the obstacle being positioned. At this time, it may be determined whether it is detected as an obstacle depending on the height from the plane. For example, obstacles which are predetermined few mm high from the plane may be determined to be ones over which the robot may drive so that they are not detected as obstacles.

Thereafter, the controller 900 converts the value of the 3D data structure storing the pixel information for the position of the obstacle into real-world coordinates (S40) This may be conversion into coordinates of the real world which the fixture map constitutes, according to an embodiment. Further, the size of the real-world coordinates may be determined depending on the size of the robot.

Thereafter, the controller 900 shifts the stationary object, which has departed from the field-of-view of the depth sensor 120, in the obstacle information of the global coordinate system, i.e., real-world coordinate system, resetting if the robot departs off the safety distance (S50). The safety distance differs depending on implemented driving algorithms but may be determined to be a space necessary when the robot rotates or a distance in a backup scenario. This regards an embodiment in which when the stationary obstacle stored in the temporary map is not positioned any more in the safety distance of the robot, it is removed from the temporary map.

FIGS. 3 and 4 are views illustrating results of removal of information corresponding to the floor surface from information sensed by the depth sensor according to an embodiment of the present disclosure. FIGS. 3 and 4 illustrate embodiments of steps S20 and S30.

FIG. 3 illustrates an image 21 captured by the vision sensor 130 and an image 22 captured by the depth sensor 120 for a particular space. Among the obstacles identified by the vision sensor 130, 21a to 21e indicate obstacles arranged near the floor surface. These are shown in the image 22 including the depth information of the depth sensor 120 and, as indicated with 22a to 22e, are not distinguished because they are similar to the depth information for the floor surface. Thus, if the depth information of the depth sensor 120 is applied to obstacle avoidance as shown in FIG. 3, the overall floor surface may probably be determined to be an obstacle.

Therefore, removal of the depth information corresponding to the floor surface may enable detection of obstacles more accurately.

FIG. 4 is a view illustrating a result of removal of depth information corresponding to the floor surface by applying an embodiment of the present disclosure to the depth-sensed image 22 of FIG. 3. In other words, a plane equation for the floor may be derived using the information about the floor where the robot is positioned. The plane equation may be obtained using such information as the material, color, or kind of the floor, with the information stored in the fixture map 210. The x, y, and z values of each point sensed by the depth sensor 120 are put into the plane equation, thereby determining that it is a plane.

For example, the points indicated with 22f to 22i of FIG. 3 are all points in the floor. If the x, y, and z values, which are the depth information about the points, are put into the plane equation, and they are ones for the floor, the points indicated with 22f to 22i are determined to be in the floor and may thus be removed from the depth information. In contrast, if the x, y, and z values which are depth information for the points 22a to 22e are put into the plane equation, they may be determined to be not in the floor. In this case, the points 22a to 22e may be determined to be obstacles.

During the course of applying the above-described process, the depth information corresponding to the positions of the points 21a to 21e which have colors separate from the color or material of the floor as compared with the image captured by the vision sensor 130 may be determined to be obstacles.

Or, obstacles which are very low in height may be determined to be the same as the floor, but not as obstacles.

A look at 23 of FIG. 4, unlike 22 of FIG. 3, shows depth information from which the points 22f to 22i and similar planes and obstacles very close to the floor have been removed. Of the high obstacle and the low obstacle, in 21b, only the low obstacle is identified as an obstacle with depth information as indicated with 23b.

The depth information for the floor surface and obstacles may be identified by applying the present disclosure as shown in FIGS. 3 and 4. Thus, the depth information for the obstacles may be stored in the positions of the global coordinate-based temporary map, and the robot may move based on the temporary map. The obstacles stored in the temporary map may remain in the temporary map until before they are a predetermined distance away from the robot, i.e., before the robot departs from the safety distance, allowing the robot to operate while avoiding the obstacles even when rotating or backing up.

To that end, the robot has information for the plane equation in the case of obtaining the information for the floor surface in each space and the depth information for the floor surface, and thus, if the depth information is first sensed as it moves to the space, the robot may calibrate the depth information.

In sum, the depth sensor 120 may sense the depth of the floor surface in the driving direction of the robot and the objects on the floor surface, thereby generating first depth information (22 of FIG. 3) including the x, y, and z values. The plane analyzer 160 may put the x, y, and z values of the first area of the first depth information into the plane equation constituting the floor surface information and, if it is determined to be in the floor surface, removes the first area from the first depth information, thereby generating second depth information as indicated with 23 of FIG. 4.

FIG. 5 is a view illustrating a configuration of a fixture map according to an embodiment of the present disclosure.

The fixture map 210*a* may be configured as a kind of bitmap. In the bitmap of the image file, each bit may be configured to represent a unit area. The left bottom unit area and the top right unit area may be indicated with (0, 0) and (19, 19), respectively. 210*a* of FIG. 5 may have a data structure of 20×20. For example, information about whether an object is placed for each position may be included. Information may be placed as in a sort of matrix and, if a stationary object is placed, the value of the matrix may be set as a preset value.

The fixture map 210*a* may also store feature information for stationary objects, and the feature information for the objects may be divided into categories and be stored in the fixture map 210*a*. The black portions 211 in the fixture map 210*a* of FIG. 5 represent objects of a material which do not transmit light, such as concrete. These may be stored as corresponding to category 99.

The portions 212 represent objects of a material which partially transmits and partially reflects light, such as translucent glass. These may be stored as corresponding to category 97. The portions 213 represent objects of a material with high light transmittance, such as glass. These may be stored as corresponding to category 93.

In other words, the fixture map 210*a* of FIG. 5 may store the category of the object feature of each space in the 20×20 bitmap. This may include values (0) that indicate empty spaces or feature information (category 93, 97, or 99) for particular stationary objects in the 20×20 matrix. The feature information for the objects reflects the material, color, or fixation of the objects and the feature information may be applied to mobile objects as well.

The feature information for the objects may be diversified depending on implementations and is not limited to a specific number according to the present disclosure.

Meanwhile, the information for the floor surface may be input for empty spaces, but not stationary objects. The floor surface information includes information indicating the color, material, or an applicable plane equation. The kind of the floor surface may be classified by the above-described factors. The floor surface information may store a kind of categorized information to be able to be stored in the fixture map 210*a*, and the category information may be configured separately.

FIG. 6 is a view illustrating feature information for information stored in a fixture map and categories therefor, according to an embodiment of the present disclosure.

201*a* suggests a range of categories assignable to stationary objects and a range of categories assignable to the floor surface. 201*b* shows a specific example in which different categories are applied depending on object materials. 201*b* reflects material features to the categories, as an embodiment of feature information, with the signal reflection intensity using the lidar sensor 110 and may also reflect materials and color features according to values sensed by other sensors. After divided according to the stationary objects and floor surface features, information for plane equations applied to the floor surfaces (information vX, vY, vZ, and vD which are coefficients constituting the plane equation) may be stored as in 201*c*. 201*a* to 201*c* may be stored in a separate database in the map storage 200 in association with the fixture map 210*a*.

As indicated with 201*c* of FIG. 6, the robot may obtain the plane equation for the floor while driving in the space so as to obtain a plane equation corrected according to the floor features. According to an embodiment, the robot moves on each of the floor surfaces divided into specific categories, thereby obtaining a plane equation for a corresponding floor surface. According to an embodiment, if the robot is set to drive in a busy space, e.g., an airport, hotel, hospital, or school, x, y, and z depth information for three points for obtaining the plane equation, which is information for the floor present in the space, may be previously measured by the depth sensor 120 and is built up in a database.

According to an embodiment, the (x, y, z) depth information for the three points in the same position may be configured as in Equation 1 and be stored in the database.

[Equation 1]

a) depth information for three points for a marble (feature information category 7) floor surface $$\text{double plane1\_320[3]=\{40,230,2040\};}$$

$$\text{double plane2\_320[3]=\{280,230,2040\};}$$

$$\text{double plane3\_320[3]=\{160,200,2850\};}$$

b) depth information for three points for a (red) carpet (feature information category 1) floor surface $$\text{double plane1\_320[3]=\{40,230,2010\};}$$

$$\text{double plane2\_320[3]=\{280,230,2010\};}$$

$$\text{double plane3\_320[3]=\{160,200,2800\};}$$

c) depth information for three points for a gray (feature information category 3) floor surface $$\text{double plane1\_320[3]=\{40,230,2030\};}$$

$$\text{double plane2\_320[3]=\{280,230,2030\};}$$

$$\text{double plane3\_320[3]=\{160,200,2820\};}$$

A vector for any one kind of floor surface may be obtained as in Equation 2 based on the above information. The vector of Equation 2 below may be applied to a), b) and c) of Equation 1.

$$vec1[0]=plane2\_320[0]-plane1\_320[0];$$

$$vec2[0]=plane3\_320[0]-plane1\_320[0];$$

$$vec1[1]=plane2\_320[1]-plane1\_320[1];$$

$$vec2[1]=plane3\_320[1]-plane1\_320[1];$$

$$vec1[2]=plane2\_320[2]-plane1\_320[2];$$

$$vec2[2]=plane3\_320[2]-plane1\_320[2]; \quad \text{[Equation 2]}$$

vX, vY, vZ, and vD which are coefficients to be applied to the plane equation may be obtained as in Equation 3 using the vectors obtained in Equation 2.

$$vX=(vec1[1]*vec2[2])-(vec1[2]*vec2[1]);$$

$$vY=((vec1[0]*vec2[2])-(vec1[2]*vec2[0]));$$

$$vZ=(vec1[0]*vec2[1])-(vec1[1]*vec2[0]);$$

$$vD=(vX*plane1\_320[0])-(vY*plane1\_320[1])+(vZ*plane1\ 320[2]); \quad \text{[Equation 3]}$$

The final plane equation is obtained as in Equation 4. Here, nX, nY, and nZ are the x and y pixel values and Z value (distance) of each pixel of the depth information for the space sensed by the depth sensor 120 while the robot is driving and, if the result of inputting the depth information sensed by the depth sensor 120 meets 0, the space corresponding to the pixel is determined to be a plane, i.e., the floor surface.

$$pY=(vX*nX)-(vY*nY)+(vZ*nZ)-vD;$$  [Equation 4]

That is, the plane analyzer 160 inputs the coefficients vX, vY, vZ, and vD, which constitute the plane equation of the corresponding space, and nX, nY, and nZ, which are depth information sensed in real-time by the depth sensor 120 of the robot, to Equation 4. If pY, the result of calculation, is 0, the space of the pixel corresponding to nX, nY, and nZ corresponds to a plane, i.e., the floor surface. Thus, if the pixel value corresponding to nX, nY, and nZ is removed, the obstacles may be displayed, with the floor surface removed from the depth-sensed information.

Figure 7:
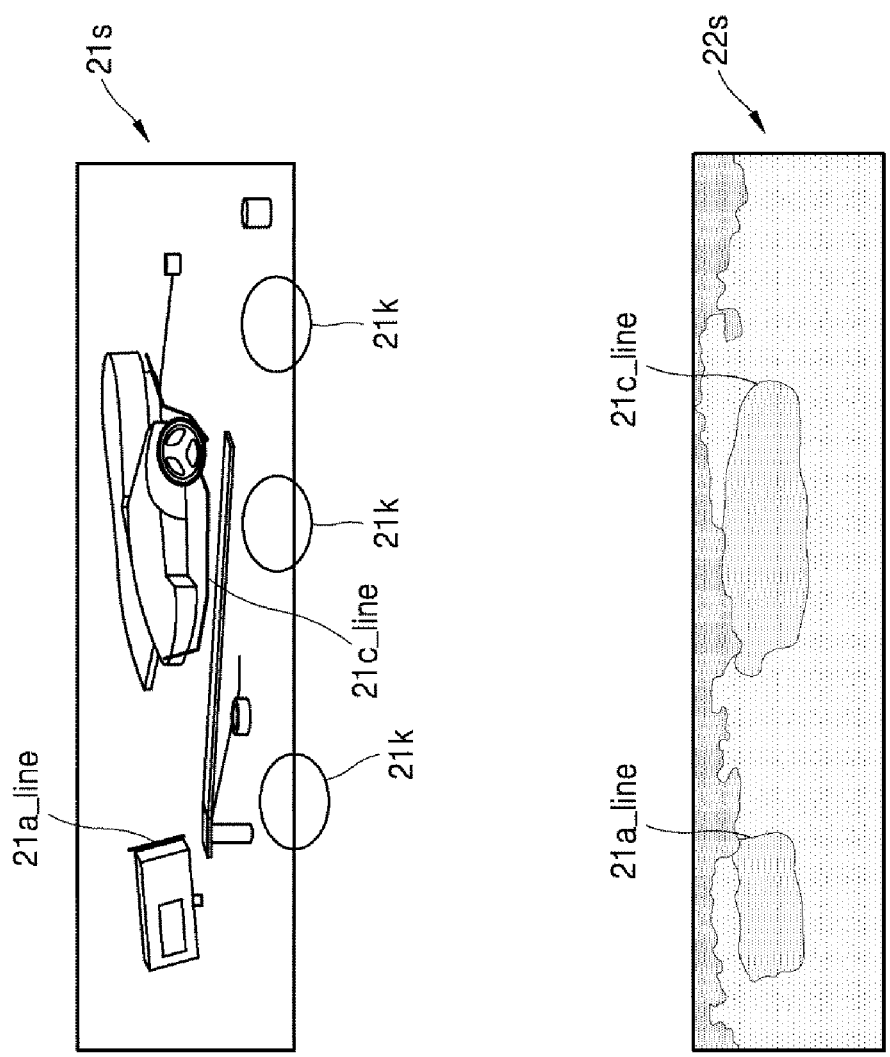
FIG. 7 is a view illustrating a process of detecting an obstacle using a vision sensor according to an embodiment of the present disclosure.

FIG. 7 is a view illustrating a process of detecting an obstacle using a vision sensor according to an embodiment of the present disclosure.

The depth-sensed information of FIGS. 3 and 4 undergoes calibration based on the plane equation for the floor surface as described above in connection with FIGS. 5 and 6 and then a floor surface removal process. Further, a process of determining that depth information corresponding to the point where a drastic change in the material or color occurs in the image information sensed by the vision sensor 130 is an obstacle.

FIG. 7 is a view illustrating an example of distinguishing between the floor surface and obstacles based on an image sensed by the vision sensor according to an embodiment of the present disclosure.

21*s* and 22*s* are magnified images of the image where obstacles 21*a* to 21*e* the depth sensor 120 fails to distinguish from the floor surface in 21 and 22 of FIG. 3 are disposed. In the magnified image 21*s* of the image sensed by the vision sensor 130, the controller 900 identifies, per pixel, portions of the magnified image 21*s*, which show a large difference in RGB values. In the case of the same floor surface, the brightness of the floor surface may be varied depending on light, but no drastic change in RGB values occurs.

However, where an obstacle is placed, and the obstacle has a different color from the floor surface, a difference in RGB values increases at the border between the obstacle and the floor surface. The portion indicated with 21*k* is a floor surface partially brightened by light, but the change in color of the floor surface occurs sequentially. In contrast, the portion indicated with 21*a*_line or 21*c*_line has a different color from the floor surface and exhibits a large difference in color.

In other words, in the process of sequentially scanning the image sensed by the vision sensor 130, the controller 900 may identify only portions where each pixel exhibits a large difference from its neighboring pixels. For the identified portion, the controller 900 may determine the corresponding object as an obstacle although the depth value 22*s* sensed by the depth sensor 120 is similar to that of the floor surface.

In sum, the vision sensor 130 captures objects in the advancing direction, thereby generating image information. The controller 900 identifies the border line where the difference in color between two adjacent pixels is a preset reference or more in the image information and maintains the area corresponding to the border line in the first depth information or second depth information not to be removed as the floor surface.

FIG. 8 is a view illustrating a result of obtaining a difference from a neighboring pixel in an image sensed by the vision sensor, by the controller, according to an embodiment of the present disclosure. As a result of magnifying a portion of the image sensed by the vision sensor 130 as described above, the RGB values of the right pixel are subtracted from the RGB values of the left pixel and the result is then normalized. As the RGB values, typical 256×256×256 Red/Green/Blue values may be applied, but the present disclosure is not limited thereto. As the difference in the RGB values, differences in R, G, and B may be calculated, or such differences may be accumulated.

FIG. 8 illustrates differences between the left and right pixels in 5×5 pixels. Here, if the absolute value of the difference is 20 or more, it is determined to be different from the normal change in the floor surface, so that an obstacle may be determined to be placed in the area corresponding to the pixel. For example, a change in material or color is identified in the pixels indicated with 21_x_line1 and 21_x_line2 of FIG. 8. This portion may be combined with information sensed by the depth sensor 120 or information resultant from calibration of the sensed information or information sensed by other sensors, thereby providing obstacle determination data.

Since the depth sensor 120 and the vision sensor 130 obtain an image and depth information for a predetermined space, such a process is required as to convert position information for the objects identified as obstacles in the image into global coordinates, i.e., coordinates on the fixture map or coordinates on the temporary map corresponding to a portion of the fixture map. Based on the actual distance of the obstacle, conversion into the global coordinates is performed in relation to the robot, the result is stored, and then, the robot records the coordinates of the obstacle in the temporary map. This is described in greater detail with reference to FIG. 9.

Figure 9:
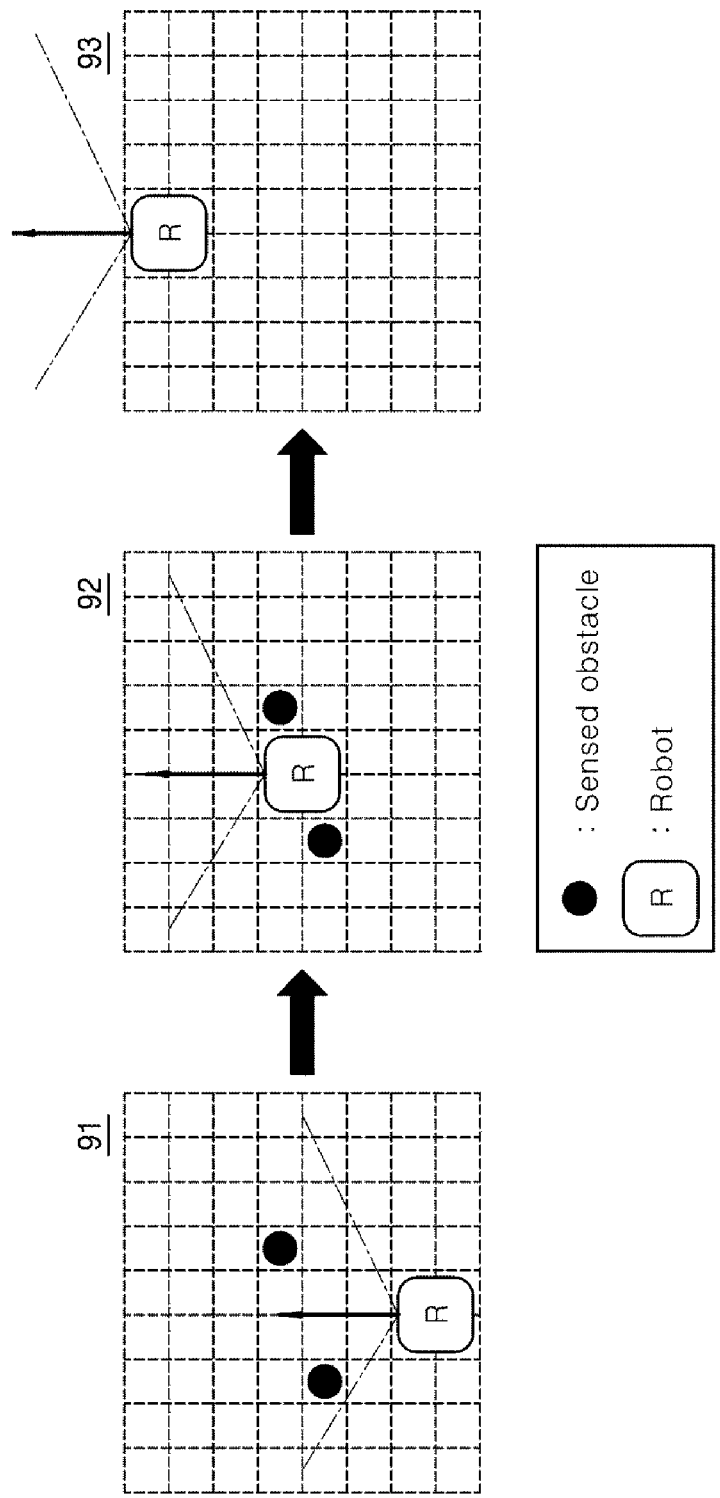
FIG. 9 is a view illustrating a process of managing an obstacle in a temporary map generated by the robot according to an embodiment of the present disclosure.

FIG. 9 is a view illustrating a process of managing an obstacle in a temporary map generated by the robot according to an embodiment of the present disclosure. In the above-described process, the robot identifies an obstacle positioned in the driving direction, converts the position of the obstacle into global coordinates, and stores the position of the obstacle on the temporary map 91 generated for the surroundings of the robot. While the robot drives, the dashed lines indicate a range in which the sensors of the robot detects obstacles.

If the robot senses the obstacle and stores in the temporary map 91 and moves straight, the position of the obstacles is changed from the front (see the temporary map 91) of the robot to a side (temporary map 92). In this state, the sensors of the robot may not detect obstacles and thus store the obstacles, as they are, on the temporary map 92.

That is, since the robot may collide with an obstacle while rotating although departing from the range of detection by the depth sensor 120 of the robot, the obstacle keeps on being stored in the 3D temporary map 92. Thereafter, if the robot departs from the range of detection by the depth sensor 120 of the robot and escapes from the area where the robot may collide during rotation or backup as in 93, the obstacles are deleted from the temporary map 93.

Meanwhile, in FIG. 9, the temporary map may store the height of the obstacles. In the process of converting the depth information into global coordinates, the height information may be obtained, and the controller 900 does not save obstacles which are lower than a predetermined height (e.g., very low obstacles, such as electric wires) and controls the robot to move over the obstacles.

Figure 10:
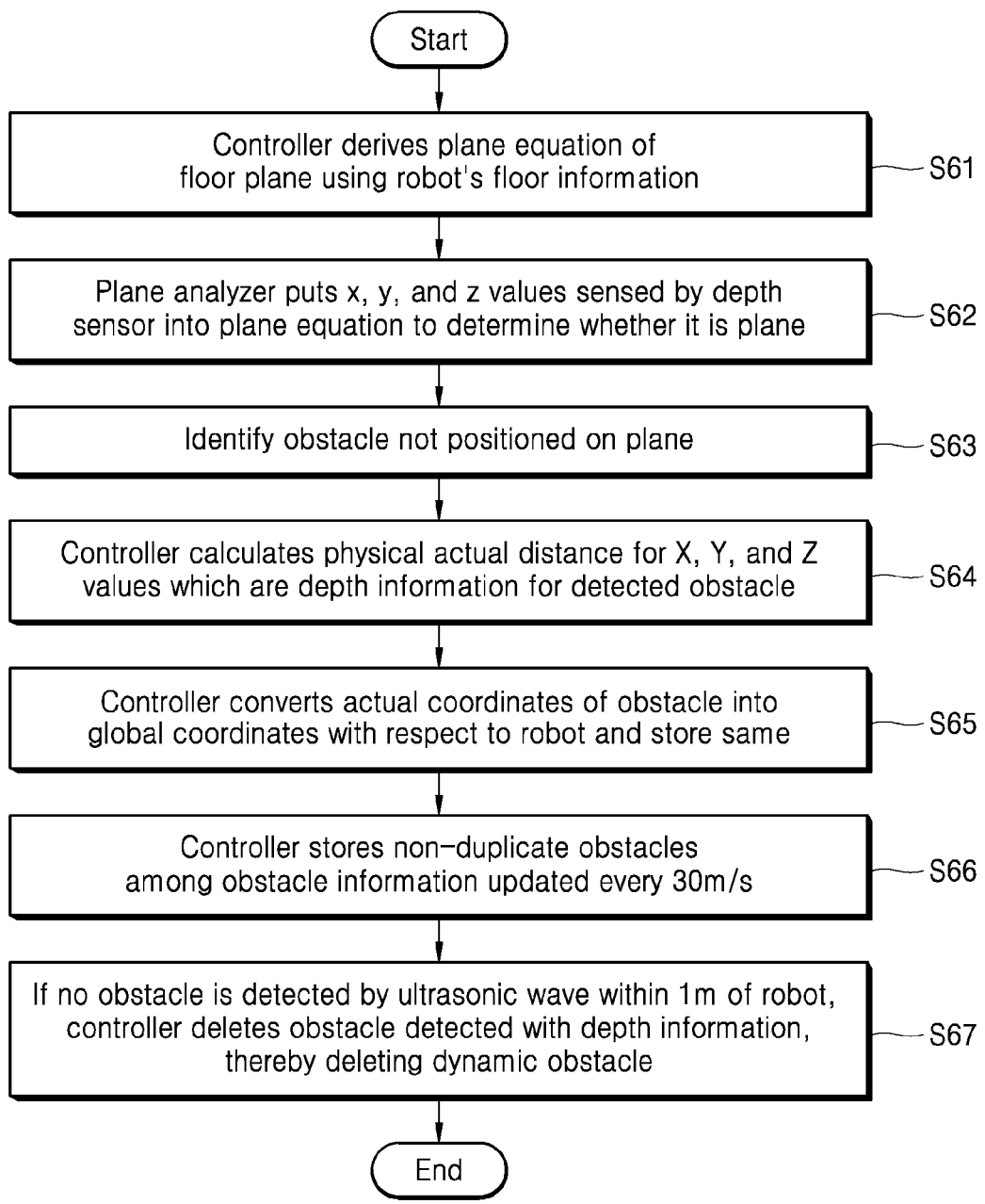
FIG. 10 is a view illustrating a process in which the robot identifies obstacles on the floor and moves and a process in which the robot stores the obstacles and, after moving, deletes the obstacles according to an embodiment of the present disclosure.

FIG. 10 is a view illustrating a process in which the robot identifies obstacles on the floor and moves and a process in which the robot stores the obstacles and, after moving, deletes the obstacles according to an embodiment of the present disclosure.

The controller 900 derives a plane equation for the floor plane using its own floor information, i.e., the floor surface information (S61). To that end, the controller 900 may previously extract information about the material, color, or kind of the floor or coefficient information for the plane equation for the floor stored in the map storage 200.

The plane analyzer 160 puts depth information, i.e., the x, y, and z values of each pixel, sensed by the depth sensor 120 into the plane equation, thereby determining whether the pixel is included in the plane (S62). As a result of determination, depth information for the pixels positioned in the plane is removed while only obstacles not positioned in the plane are left and identified by the controller (S63).

Where all of the pixels are determined in step S62 to be in the plane, the space may be obstacle-free and may thus be determined to allow the robot to pass. The controller 900 obtains the depth information, i.e., x, y, and z values, for the detected obstacles as the physical, actual distance from the robot (S64). The controller 900 performs conversion into global coordinates in relation to the robot based on the actual distance of the obstacle and stores the result (S65).

Thereafter, the robot stores non-duplicate obstacles in the obstacle information which is updated every 30 m/s during the course of detecting obstacles or while the robot moves (S66). 30 m/s is merely an example, and other various values may be adopted. If no obstacle is detected with ultrasonic waves within a predetermined range, e.g., 1 m, from the robot, the controller 900 deletes the obstacles detected in the depth information from the temporary map, thereby deleting dynamic obstacles (S67). The steps S61 to S67 or, if the same material of plane is maintained, steps S62 to S67, may be repeated according to the data input period of the depth sensor 120. In an embodiment, the steps may be repeated every 30 m/s.

Figure 11:
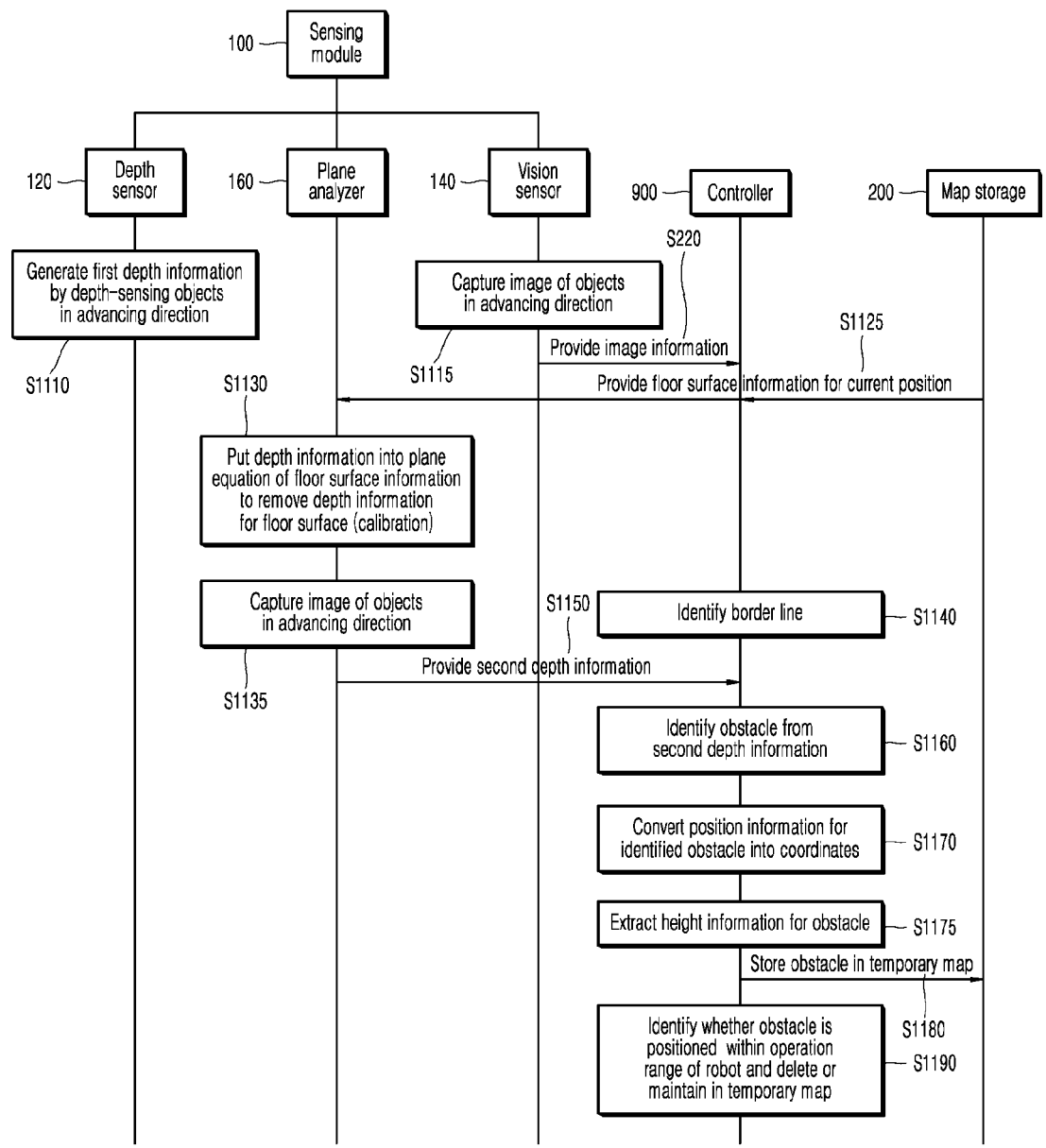
FIG. 11 is a view illustrating a process in which components of the robot operate according to an embodiment of the present disclosure.

FIG. 11 is a view illustrating a process in which components of the robot operate according to an embodiment of the present disclosure.

The depth sensor 120, which is a component of the sensing module 100 of the robot, depth-senses objects in the advancing direction, thereby generating first depth information (S1110). As an exemplary embodiment, the depth sensor 120 depth-senses the floor surface and objects on the floor surface in the driving direction, generating the first depth information containing x, y, and z values. Each pixel is generated containing the position of x and y and the depth value, z. As an example, the depth image described above in connection with FIGS. 3 and 4 is an example of depth information.

Selectively, the vision sensor 130 captures an image for the objects in the advancing direction (S1115). The vision sensor 130 provides the captured image information to the controller 900 (S1120). The map storage 200 provides floor surface information for the current position to the plane analyzer 160 under the control of the controller 900 (S1125). This allows the sensing module 100 to use the plane equation in the corresponding position or material information for the floor surface in the corresponding position.

The plane analyzer 160 receives the floor surface information stored in the map storage 200 of the robot and calibrates the first depth information generated by the depth sensor 120 using the floor surface information, generating second depth information (S1130 and S1135).

Specifically, the x and y values of each pixel and the depth value, z, which constitute the first depth information are input to the plane equation of the floor surface information so as to determine whether the pixel is in the floor surface and, if the pixel is in the floor surface, i.e., the floor plane, calibration may be performed to remove the depth information (S1130). The second depth information resultant from removing the floor surface from the first depth information is generated (S1135). Calculation may be performed per pixel, or specific areas in the depth information may be set and pixels in each area may be selected and the values of the depth information may be input to the plane equation.

The sensing module 100 provides the generated second depth information to the controller 900 (S1150). Meanwhile, the controller 900 identifies the border line from the image information sensed by the vision sensor in S1120 (S1140). Identifying the border line is, e.g., for the controller 900 to identify a border line where a difference in color between two adjacent pixels in the image information is a preset reference or more as described above in connection with FIGS. 7 and 8.

Thereafter, the controller 900 performs treatment to keep the area corresponding to the border line in the first depth information or second depth information and then identifies obstacles in the second depth information (S1160). Although FIG. 11 illustrates a process in which the controller 900 identifies the border line and then receives the second depth information, the present invention is not limited thereto.

For example, after the controller 900 identifies the border line and provides the identified information to the plane analyzer 160, the plane analyzer may combine the first depth information and the identification information for the border line, such as avoiding the area corresponding to the border line from being determined to be the floor surface although it is determined to be a plane by the plane equation in the process of removing the floor surface information from the depth information.

The controller identifies obstacles in the second depth information generated according to the above-described embodiments (S1160). That is, objects determined not to be the floor surface in the depth information are identified as obstacles. The position information for the identified obstacle is converted into coordinates (S1170) and, during this course, the height information for the obstacle is extracted (S1175), and only obstacles with a predetermined height or more are stored as obstacles in the temporary map of the map storage 200 (S1180). Exemplary embodiment of temporary map storing obstacles have been described above in connection with FIG. 9.

Steps S1170 to S1180 are described below in greater detail. The controller 900 may convert the x, y, and z values of the object, which is determined to be an obstacle in the second depth information, into global coordinates in relation to the robot and store position information for the obstacle, including the coordinates, in the temporary map. As an example of conversion into the global coordinates, the controller 900 sets the x and y coordinates of the depth information as a candidate position area on the temporary map and selectively store the height information for the obstacle on the temporary map based on the z coordinate.

As described above in connection with step S1175, if the height of the obstacle is a preset reference or less, the controller 900 may not store the obstacle in the temporary map. This is for allowing the robot to pass low obstacles. In the process during which the controller 900 stores the height of the obstacle in the temporary map and the robot moves, the controller 900 may determine whether to allow the robot to pass over, or avoid, the obstacle.

Thereafter, as described above in connection with FIG. 9, after the robot moves, the controller 900 identifies whether the obstacle is positioned within an operation range of the robot and, if the obstacle is positioned out of the operation range of the robot, deletes the obstacle from the temporary map while maintaining the obstacle in the temporary map if the obstacle is positioned within the operation range of the robot (S1190).

Although the plane analyzer 160 and the controller 900 are separated from each other in FIG. 11, the controller 900 may perform the task of the plane analyzer 160. In such a case, the controller 900 compile image information and depth information sensed by the sensing module 100 and identifies obstacles using the floor surface information stored in the map storage 200.

FIG. 12 is a view illustrating an example of storing the height of an obstacle in a temporary map according to an embodiment of the present disclosure.

1201 of FIG. 12 indicates an example of storing the height of obstacles in a temporary map 1201 after the robots removes floor surface information. The height (mm) of the obstacle is displayed on the temporary map 1201. Here, the controller 900 may separate obstacles which the robot may pass over from other obstacles depending on the height of obstacles. According to an embodiment, obstacles whose height is 30 mm or less may be all removed from the temporary map 1201. As a result, only obstacles which the robot may not pass over as in 1202 may be stored in the temporary map 1202.

As in the case where the height of the obstacle is lower than the bottom of the robot and the width of the obstacle is smaller than the interval of the moving unit of the robot, the controller may compare the space size of the moving unit and bottom of the robot and the size of the obstacle and change the moving route.

Figure 13:
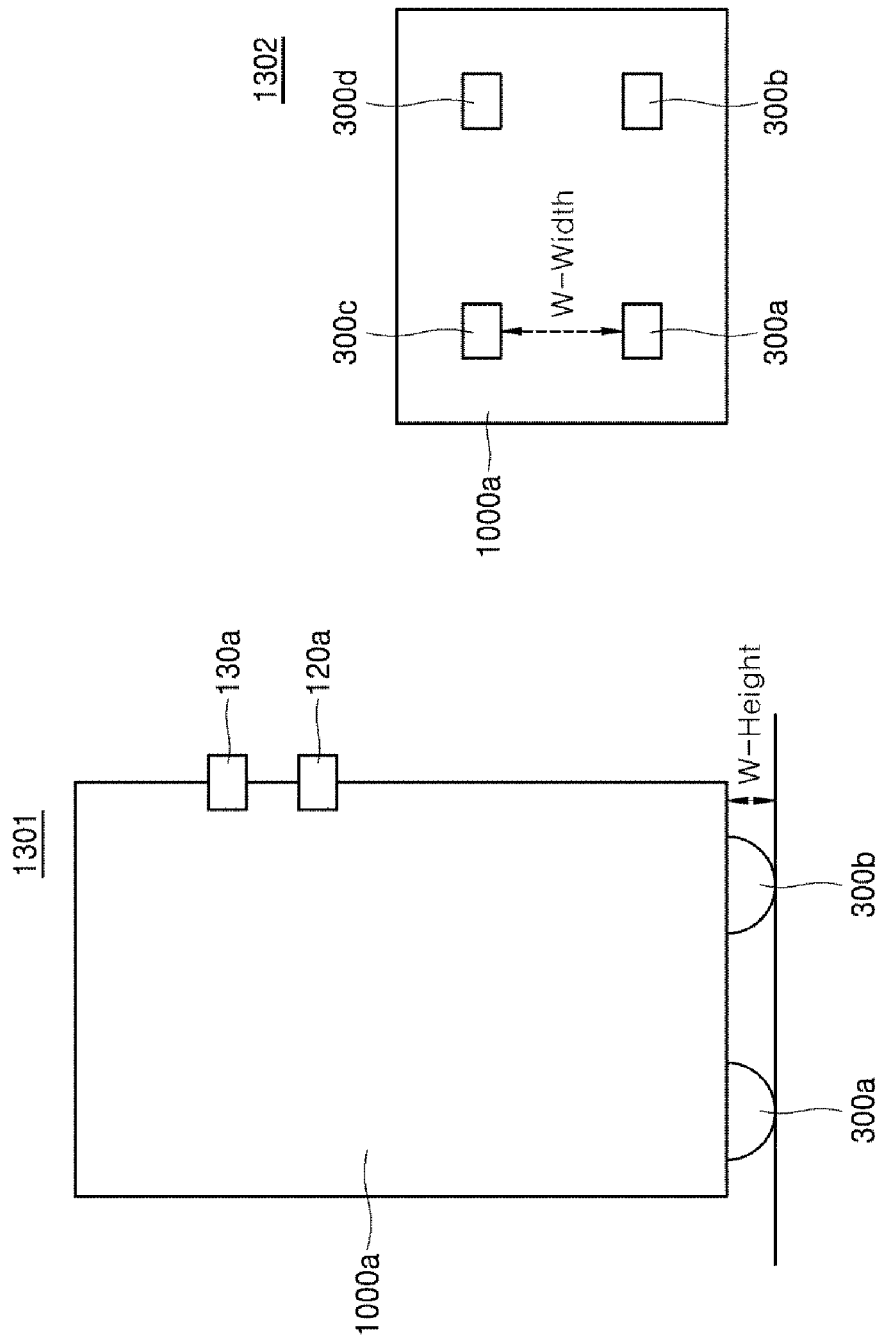
FIG. 13 is a view illustrating a configuration of a robot according to an embodiment of the present disclosure.

FIG. 13 is a view illustrating a configuration of a robot according to an embodiment of the present disclosure. A robot 1000*a* includes a depth sensor 120*a*, a vision sensor 130*a*, and a moving unit 300*a* to 300*d*. For accuracy of the image sensed by the depth sensor 120*a* and the vision sensor 130*a*, the distance between the depth sensor 120*a* and the vision sensor 130*a* may be reduced to the minimum or they may be allowed to capture the same image at a specific distance.

Although not shown in the drawings, the components of FIG. 1 may be disposed in the robot 1000*a*. 1301 is a side view of the robot, and 1302 is a bottom view of the robot.

Where the moving unit of the robot is configured of wheels as shown in FIG. 13, the distance between the wheels is W-Width, and the distance between the bottom of the robot and the floor surface is W-Height. In this case, if the width of the obstacle is smaller than W-Width, and the height of the obstacle is smaller than W-Height, the controller 900 may control the robot 1000*a* to pass the obstacle between the wheels of the moving unit. The height of the obstacle at which the moving unit of the robot may pass over the obstacle is Pass-Height. According to the configuration of the disclosure, Pass-Height is smaller than W-Height.

Figure 14:
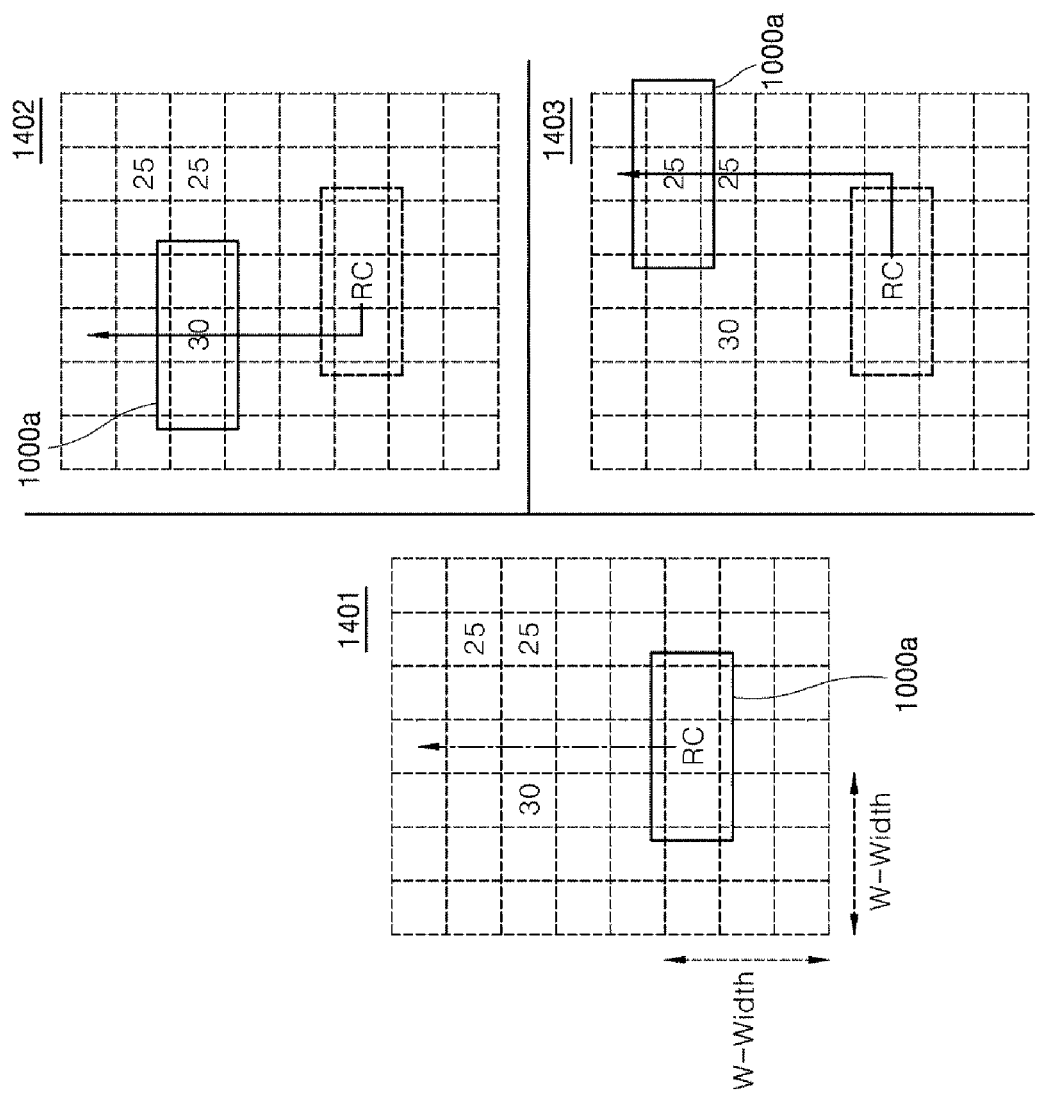
FIG. 14 is a view illustrating a process in which the robot modifies the route depending on the height and width of an obstacle placed on the floor surface according to an embodiment of the present disclosure.

FIG. 14 is a view illustrating a process in which the robot modifies the route depending on the height and width of an obstacle placed on the floor surface according to an embodiment of the present disclosure. W-Width of the robot corresponds to three units of the temporary map 1401 of FIG. 14. W-Height and Pass-Height are assumed to be 50 mm and 20 mm, respectively. When the center of the robot is positioned in the robot center (RC), the preset path of the robot in 1401 is a straight direction (dashed line). However, during the course, the moving unit of the robot encounters a 30 mm-high obstacle on the left and 25-mm high obstacles on the right. In this case, the moving unit of the robot cannot pass over the two obstacles. This is why Pass-Height of the robot of FIG. 14 is 20.

However, since the height of the obstacles on both sides is smaller than W-Height, 50, the controller 900 may modify the route of the robot, allowing the robot to pass the left-hand obstacle (30 mm high) between the wheels of the moving unit (refer to 1402) or the right-hand obstacle (25 mm high) between the wheels of the moving unit (refer to 1403).

In sum, the controller 900 of the robot may compare the height (the obstacle lower than Pass-Height) at which the moving unit of the robot may pass, the height (the obstacle lower than W-Height) at which the bottom of the robot may pass using an empty space, and the width (the obstacle narrower than W-Width) with the sensed obstacle and change the moving route of the robot.

Application of the present disclosure enables real-time, precise detection of information for obstacles within several meters of the robot so as to allow the high robot to freely move in a broad space. In particular, various heights of obstacles may be detected using various sensors of the present disclosure. For example, the lidar sensor 110 detects obstacles at installed heights and the ultrasonic sensor 140 grasps the position, status, and extent of obstacles.

Here, the information sensed by the depth sensor 120 and the vision sensor 130 may be combined together to sense obstacles placed close to the floor surface in the moving direction of the robot. In other words, in the disclosure, the 3D data (depth information) generated in real-time by the depth sensor 120 is processed to effectively detect obstacle information within a predetermined range from the robot, and obstacles in the area where the depth sensor 120 is unable to sense are stored in the temporary map 220 until the robot escapes from the area of danger, allowing the robot to move in a large space while effectively avoiding obstacles.

Thus, according to an embodiment of the present disclosure, the depth sensor 120 and the plane analyzer 160 remove floor surface information from data detected in real-time and detect only obstacle information, and the controller 900 maps the X, Y, and Z values of each pixel in the depth information to a real-world coordinate system and stores the same in a temporary map. For accurate depth sensing, the depth sensor 120 may be positioned to face the bottom.

In particular, application of the present disclosure may effectively remove floor surface information from depth information generated by the depth sensor 120. In particular, since the Z value of the depth information may exhibit a difference from 20 mm to 50 mm depending on the floor material or brightness as proposed in connection with FIG. 15, the floor surface information may be removed by applying a prior-obtained plane equation for each floor surface.

FIG. 15 is a view illustrating a variation in the Z value depending on the material of the floor. As shown in Table 1501 of FIG. 15, it can be shown that the distance (z value) of the depth sensor 120 is varied depending on the material of the floor surface, i.e., the floor. That is, since a difference from 20 mm up to 50 mm may occur in the place with a different material and brightness even at the same x and y coordinates, calibration may be performed according to the feature of the floor using the vision sensor 130 and material information for the floor which the map has as described above in connection with FIG. 6.

As an exemplary embodiment of calibration, the floor surface is removed from the depth-sensed information using the coefficients of the plane equation for the floor surface, thereby generating second depth information containing only depth information for obstacles.

Application of the present disclosure may correct the imbalance in obstacle detection of the ultrasonic sensor 140 and the lidar sensor 110. For example, although the ultrasonic sensor 140 is good at obstacle detection, it cannot figure out what direction obstacles are positioned in or the size of obstacles. The lidar sensor 110 may identify obstacles only at a preset height but not grasp the exact size and shape of obstacles.

Where embodiments of the present disclosure apply, only obstacle information may be definitely detected using depth information for obstacles separated from the floor surface, and the robot moves while generating a temporary map, which stores obstacle information using depth information updated in real-time. Thus, the likelihood of collision may be reduced. In particular, obstacle information may be stored and maintained in the temporary map even for portions which are not identifiable by the sensing module 100, and the robot is allowed to reference the temporary map until it completely escapes from the area of danger where several obstacles are placed. This may reduce the risk of accident that may arise in the sensor blind zones.

Where an embodiment of the present disclosure applies, it is possible to identify obstacles placed in the driving direction of the robot, avoid the obstacles, and change the route. In particular, the robot may identify low obstacles by depth-sensing obstacles placed close to the floor surface in the driving direction, with floor surface information left out. Various pieces of sensing information, such as depth and vision, may typically be used to distinguish between the floor surface and obstacles placed close to the floor surface. Application of an embodiment of the present disclosure may reduce the risk of collision between the robot and an obstacle, which may occur while the robot moves, using depth information updated in real-time.

Also, when all elements of the embodiments of the disclosure are described to be combined into one element or to operate in combination, the disclosure is not limited to the embodiments and all the elements may be selectively combined to operate within the scope of the disclosure. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the disclosure can be realized. Examples of a storage medium having stored the computer program include storage mediums such as a magnetic recording medium, an optical recording medium, and a semiconductor recording medium. The computer program for realizing the embodiments of the disclosure includes a program module which is transmitted via an external device in real time.

While embodiments of the disclosure have been described above, various changes or modifications can be made thereon by those skilled in the art. Accordingly, it should be understood that such changes and modifications belong to the scope of the disclosure without departing from the scope of the disclosure.

What is claimed is:

1. A method of identifying an obstacle on a driving floor surface, the method comprising:
   determining a depth of objects in a forward driving direction to generate first depth information of a robot;
   capturing images of the objects in the forward driving direction to generate image information;
   calibrating the generated first depth information using floor surface information stored by a storage of the robot to generate second depth information, wherein the floor surface information comprises at least one of material, color, or a type of the floor;
   identifying an obstacle from the generated second depth information; and
   storing position information of the identified obstacle in a map of the storage, wherein the generated first depth information is calibrated by determining depth information corresponding to positions of points of identified obstacles which have colors different from a color of the floor or a material different from a material of the floor as compared with the captured images.

2. The method of claim 1, wherein generating the first depth information further comprises generating the first depth information comprising x, y, and z values by sensing depths of a plane and objects on the plane in the forward driving direction of the robot.

3. The method of claim 2, wherein the obstacle is identified by removing a first area from the generated first depth information in a case where the x, y, and z values of the first area are input to a plane equation constituting the floor surface information and are determined to be in the floor surface.

4. The method of claim 1, wherein the obstacle is identified by:
   identifying a border line where a difference in color between two adjacent pixels in the image information is determined to be greater than or equal to a preset reference; and
   maintaining an area corresponding to the border line in the generated first depth information or the generated second depth information.

5. The method of claim 1, wherein the storing further comprises converting x, y, and z values of the identified obstacle in the generated second depth information into coordinates in relation to the robot and storing the coordinates in the map.

6. The method of claim 5, wherein the coordinates are not stored in the map based on a determination that a height of the obstacle is less than or equal to a preset reference.

7. The method of claim 1, further comprising identifying whether the identified obstacle is positioned within an operation range of the robot after the robot moves, and deleting the identified obstacle from the map based on the identified obstacle being positioned out of the operation range of the robot.

8. A robot identifying an obstacle on a driving surface, comprising:
   a sensing module depth-sensing objects in a forward driving direction of the robot to generate first depth information and to calibrate the generated first depth information using floor surface information stored by a storage of the robot to generate second depth information, wherein the floor surface information includes at least one of material, color, or a kind of the floor;
   a controller configured to identify an obstacle in the generated second depth information;

a storage configured to store a map for storing position information about the identified obstacle;

a moving unit configured to move the robot; and a sensor configured to generate image information by capturing the objects in the forward driving direction, wherein the generated first depth information is calibrated by determining depth information corresponding to positions of points of identified obstacles which have colors different from a color of the floor or a material different from a material of the floor as compared with the captured images of the objects.

9. The robot of claim 8, wherein the sensing module comprises
a depth sensor configured to depth-sense the objects in the forward driving direction to thereby generate the first depth information.

10. The robot of claim 8, wherein the depth sensor is further configured to generate the first depth information comprising x, y, and z values by sensing depths of a plane and objects on the plane in the forward driving direction of the robot.

11. The robot of claim 10, wherein the controller is further configured to generate the second depth information by removing a first area from the first depth information in a case where the x, y, and z values of the first area are input to a plane equation constituting the floor surface information and are determined to be in the floor surface.

12. The robot of claim 8, wherein the controller is further configured to identify a border line where a difference in color between two adjacent pixels in the image information is a preset reference or more and maintain an area corresponding to the border line in the first depth information or the second depth information.

13. The robot of claim 8, wherein the map stores position information for the obstacle which are a result of converting x, y, and z values of the obstacle in the second depth information into coordinates in relation to the robot.

14. The robot of claim 13, wherein the controller is further configured to not store the coordinates in the map based on a determination that a height of the obstacle is determined to be less than or equal to a preset reference.

15. The robot of claim 13, wherein the controller is further configured to control the moving unit to move the robot and then to identify whether the obstacle is positioned within an operation range of the robot and to delete the obstacle from the map based on a determination that the obstacle is positioned out of the operation range of the robot.

* * * * *